US008429639B2

(12) United States Patent
Jirka (10) Patent No.: US 8,429,639 B2
(45) Date of Patent: Apr. 23, 2013

(54) IMAGE-BASED SOFTWARE UPDATE

(75) Inventor: Ian C. Jirka, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 12/368,316

(22) Filed: Feb. 10, 2009

(65) Prior Publication Data

US 2010/0205594 A1 Aug. 12, 2010

(51) Int. Cl.
*G06F 9/44* (2006.01)

(52) U.S. Cl.
USPC ........... 717/168; 717/169; 717/170; 717/175; 717/177

(58) Field of Classification Search ............ 714/15; 717/170
See application file for complete search history.

(56) References Cited

U.S. PATENT DOCUMENTS

| 6,009,274 | A | 12/1999 | Fletcher et al. | |
|---|---|---|---|---|
| 6,681,389 | B1 | 1/2004 | Engel et al. | |
| 6,836,859 | B2 | 12/2004 | Berg et al. | |
| 7,664,984 | B2 * | 2/2010 | Wang et al. | 714/15 |
| 8,001,079 | B2 * | 8/2011 | Lu et al. | 707/616 |
| 2003/0037282 | A1 | 2/2003 | Berg et al. | |
| 2006/0090136 | A1 | 4/2006 | Miller et al. | |
| 2007/0094348 | A1 | 4/2007 | Scheidel et al. | |
| 2007/0233698 | A1 | 10/2007 | Sundar et al. | |
| 2008/0144471 | A1 | 6/2008 | Garapati et al. | |
| 2009/0007105 | A1 * | 1/2009 | Fries et al. | 718/1 |

FOREIGN PATENT DOCUMENTS

WO 2008013393 A1 1/2008

OTHER PUBLICATIONS

Satyanarayanan, Ottalingam T., "Software Image Management for Large Networks", retrieved at <<http://ieeexplore.ieee.org/stamp/stamp.jsp?arnumber=01045782>>, IEEE, 2002, pp. 217-221.
Geek, Metro Tek, "Understanding the New Hyper-V Feature in Windows Server 2008", retrieved at <<http://www.howtogeek.com/howto/the-geek-blog/understanding-the-new-hyper-v-feature-in-windows-server-2008/>>, Dec. 19, 2008, pp. 3.
"What is Sysprep", retrieved at <<http://technet.microsoft.com/en-us/library/cc721940.aspx>>, Dec. 19, 2008, pp. 5.
"Licensing Microsoft Server Products with Microsoft Virtual Server and Other Virtual Machine Technologies", retrieved at <<http://download.microsoft.com/download/6/8/9/68964284-864d-4a6d-aed9-f2c1f8f23e14/virtualization_brief.doc>>, Oct. 2006, pp. 12.
"Customize Windows in Audit Mode", retrieved at <<http://technet.microsoft.com/en-us/library/cc722413.aspx>>, Dec. 19, 2008, pp. 2.

(Continued)

*Primary Examiner* — Don Wong
*Assistant Examiner* — Deric Ortiz
(74) *Attorney, Agent, or Firm* — Jared S. Goff (57) ABSTRACT

State data can be separated from an existing software stack stored in one or more computer storage units in a computer system. The existing software stack can include operating system software and application software, and the state data can represent one or more states of the existing software stack. An image can be stored in one or more computer storage units in the computer system, and the stored image can form an updated software stack including operating system and application software. In addition, the updated software stack can be configured using the state data.

20 Claims, 11 Drawing Sheets

OTHER PUBLICATIONS

"KB954356, Article ID 954356", retrieved at <<http://support.microsoft.com/kb/954356>>, Dec. 19, 2008, pp. 1.

"Sysprep Support for Server Roles", retrieved at <<http://technet.microsoft.com/en-us/library/cc722158.aspx>>, Dec. 19, 2008, pp. 2.

"How to Move the OperationsManagerDW Database in Operations Manager 2007", retrieved at <<http://technet.microsoft.com/en-us/library/cc540368.aspx>>, Dec. 19, 2008, pp. 4.

"Microsoft Virtual Hard Disk Overview", retrieved at <<http://technet.microsoft.com/en-us/bb738373(printer).aspx>>, Nov. 6, 2006, pp. 2.

"Q&A: Businesses Get an 'Easy Button' for Software Evaluation with Microsoft's New Virtualization Program", retrieved at <<http://www.microsoft.com/presspass/features/2006/nov06/11-06virtualization.mspx>>, Nov. 6, 2006, pp. 3.

"VHD Test Drive Program" retrieved at <<www.microsoft.com/vhd>>, White Paper, Nov. 2006, pp. 10.

"What is Sysprep", retrieved at <<http://technet.microsoft.com/en-us/library/cc721940(printer).aspx>>, Dec. 19, 2008, pp. 5.

* cited by examiner

IMAGE-BASED SOFTWARE UPDATE

BACKGROUND

Software deployment of complex server applications can be a painstaking process. Typically, such deployment begins with installing an operating system on a machine. Next, prerequisite components are installed or enabled to support the installation of desired software applications. Next, the software applications are installed. Finally, the operating system can be configured to be optimized for the installed software applications (such as by shutting down services that are not needed by the applications). These operations can take a lot of time and effort on the part of the software customer. Additionally, because the deployment typically includes numerous operations that take place on the customer's hardware and software configuration, there is a risk that the installation will fail because it can involve many states and complex interactions between the states and computing components.

One way to address this problem is to deliver a pre-built appliance image. As used herein, an image is a software copy that includes all software needed to run on a physical or virtual machine and that reflects the state of such a machine. An appliance is a type of image that includes all the software needed to run on a physical or virtual machine, and that is designed to be used for one or more specific tasks or to address one or more specific problems. Updating an appliance to a new version typically still requires numerous operations to be performed during the update phase. This has the additional problem that the new version is not a "clean" installation—changes made throughout the operating system and applications in the software stack prior to the update are preserved during the update. Because the update does not start from a known state, there is an added risk of failure or undesired behavior after the update.

SUMMARY

Whatever the advantages of previous software update tools and techniques, they have neither recognized the software update tools and techniques described and claimed herein, nor the advantages produced by such tools and techniques.

In one embodiment, state data can be separated from an existing software stack stored in one or more computer storage units in a computer system. The existing software stack can include operating system software and application software, and the state data can represent one or more states of the existing software stack. An image can be stored in one or more computer storage units in the computer system, and the stored image can form an updated software stack including operating system and application software. In addition, the updated software stack can be configured using the state data.

In another embodiment, an existing software stack can be stored in a first set of one or more storage units, the software stack including operating system and application software. State data can be stored in a second set of one or more storage units, the state data representing one or more states of the existing software stack. Moreover, a deployment coordinator can be configured to store an image to form an updated software stack, which can include operating system and application software. The updated software stack can be configured to access the state data.

In yet another embodiment, state data can be extracted from an existing software stack. The existing software stack can be replaced with an image to form an updated software stack, and the state data can be injected into the updated software stack.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Described embodiments are directed to techniques and tools for improved updating of software. Such improvements may result from the use of various techniques and tools separately or in combination.

Such techniques and tools may include separating state data from an existing software stack, such as an existing appliance. The software stack can include operating system software and application software, though the software stack may be running on other software, such as a virtual host. As used herein, operating system software is software that acts as a host for one or more applications, such as by managing and coordinating activities and the sharing of the limited resources of a physical or virtual machine.

The state data represents one or more states of the software stack (i.e., one or more states that pertain to the software stack, which may include states of pertinent components of a surrounding computing environment), and the state data typically applies to the operation of the specific software stack. The state data can be software configuration data or other state data. It can be data entered by a user and/or data gathered from the computing environment. Following are some examples of different types of state data: user information; environmental states (low on memory, etc.); user-created and/or user-updated rules for monitoring a computing environment; templates for the creation of specific virtual environments; and user interface settings (favorite views, order of columns, etc.).

Separating the state data from the existing software stack can include storing the state data in a storage location that will not be deleted when the existing software stack is deleted. This storage location could take several forms, such as a virtual hard drive, a physical hard drive, an external USB drive, a location in RAM, etc. As an example, the state data can be extracted from the existing software stack and stored in such a separate location. As another example, the state data can be maintained in such a separate location while the existing software stack is in use.

The existing software stack can be replaced with an updated image (such as an updated appliance) to form an updated software stack that can be run by an underlying physical or virtual machine. The replacement can include directly overwriting the existing software stack with the image. Alternatively, the replacement can include storing the image and deleting the existing software stack at different times. Indeed, the existing software stack can remain stored even after the updated software stack becomes operational. It may be desirable to maintain a snapshot of the existing software stack until after the operation of the updated software stack is verified.

Accordingly, one or more substantial benefits can be realized from the image-based software update tools and techniques described herein. For example, image-based updating as described herein can be done quickly with little input from a user. In addition, the updated software can be installed as an image that replaces existing software, so that the software update starts from a known state, leading to more reliable updates than updates using previous techniques.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

Figure 1:
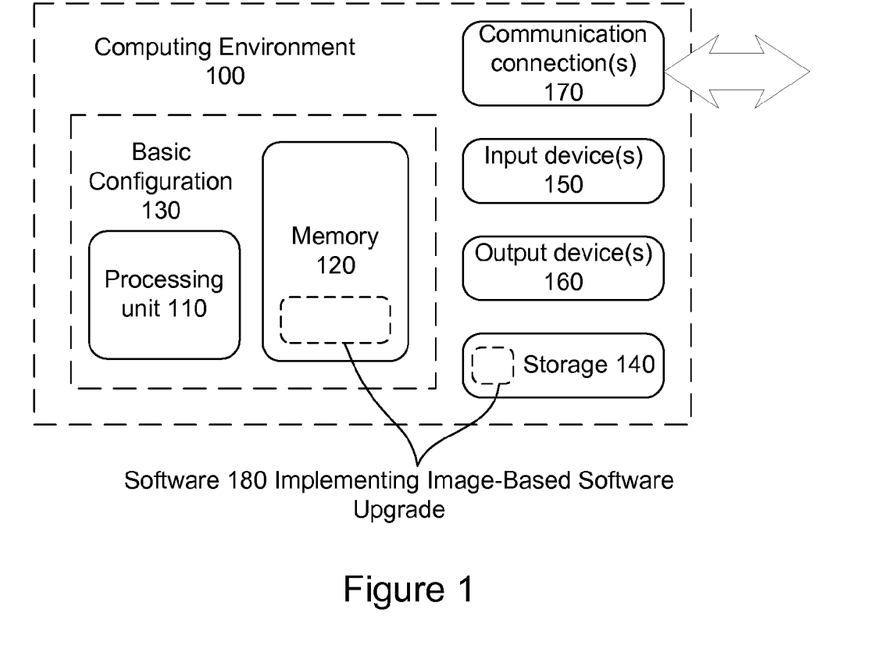
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used for image-based software updating. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be real and/or virtual, and it may be volatile memory (e.g., registers, cache, RAM), non-volatile memory (e.g., ROM, EEPROM, flash memory), or some combination of the two. The memory (120) stores software (180) implementing image-based software updates.

Although the various blocks of FIG. 1 and the other figures are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "separate," "store," and "replace" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Image-Based Update System and Environment

A. General Image-Based Update Environment

Figure 2:
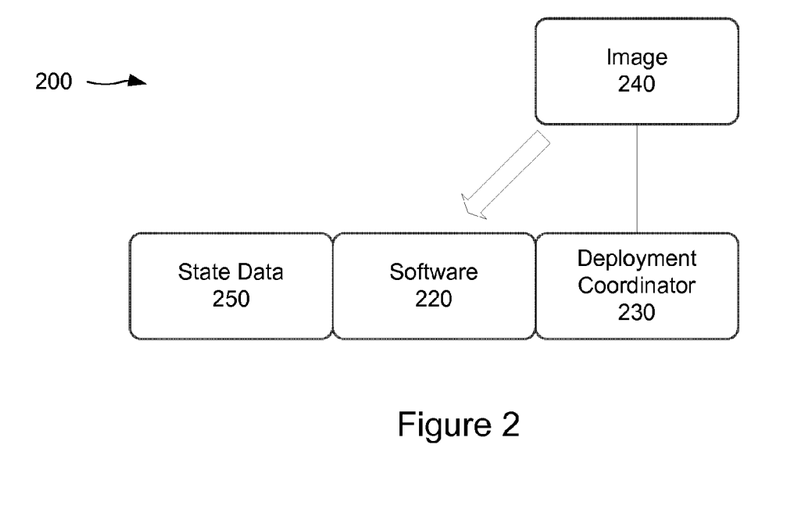
FIG. 2 is a block diagram illustrating an environment for image-based updates.

FIG. 2 is a block diagram of an image-based update computing environment (200) in conjunction with which one or more of the described embodiments may be implemented. The update environment (200) includes a software stack (220) to be updated. For example, the software stack (220) can be an appliance. The software stack can be stored in a storage unit, such as a physical or virtual hard drive.

A deployment coordinator (230) can execute within a computing environment, such as the environment illustrated in FIG. 1, to replace the software stack (220) with an image (240) to form an updated software stack (220). This replacement can include overwriting the existing software stack (220) with the image (240) in storage to form an updated software stack (220). Alternatively, this replacement can include de-activating the existing software stack (220) and writing the image (240) to a new storage location where it can be executed by a supporting virtual or physical machine to form the updated software stack (220). The existing software can then be deleted at some later time. In either event, a snapshot can be taken of the software stack (220) prior to the update so that the software stack (220) can be returned to its pre-update state if desired. As used herein, a snapshot is stored information that allows the state of a storage unit at a particular time to be reconstructed at a later time. Such a snapshot can be deleted or merged with snapshot data of the updated software stack (220) after it is confirmed that the updated software stack (220) is operating correctly. The deployment coordinator (230) is software and/or hardware that coordinates the image-based software stack update. The deployment coordinator (230) can include components running on a hypervisor or physical hardware, in the existing software stack, and/or in the updated software stack.

The image (240), which used for updating, can be generated using techniques that are similar to the formation of images used for initial installations. For example, an image host (a virtual machine or physical machine) can be created, and an operating system can be installed on the image host. Then, operating system updates and pre-requisite software can be installed, and the operating system can be configured. For example, the operating system may be configured in an optimal way for one or more applications that are to be installed. One or more applications can then be installed and configured. The image can then be prepared for generalization in a standard manner, and the image can then be generalized.

State data (250) can be separated from the software stack (220) prior to the software stack (220) being replaced with the image (240), and the updated software stack (220) can be configured according to the state data (250). For example, the state data (250) can be maintained in a storage unit, such as a virtual hard drive, that is separate from storage for the software stack (220) during the ordinary course of operating the software stack (220). As another example, the state data (250) can be extracted from the software stack (220) either directly by the deployment coordinator (230), by the software stack (220) under the direction of the deployment coordinator (230), or in some other manner. As yet another example, some of the state data (250) can be maintained separate from the software stack (220) during the ordinary course of operating the software stack (220), and the rest of the state data (250) can be extracted from the software stack (220).

After the software stack (220) has been replaced with the image (240), the updated software stack (220) can be configured according to the state data (250). Such a configuration may include the updated software stack (220) being configured to access the state data (250) in an existing state data storage location. Alternatively, the configuration of the software stack (220) may include injecting the state data into the software stack (220), such as by passing the state data (250) to the software stack (220) and/or copying the state data (250) into appropriate locations in the software stack (220).

B. Image-Based Update Environment with State Data Extraction and Injection

Figure 3:
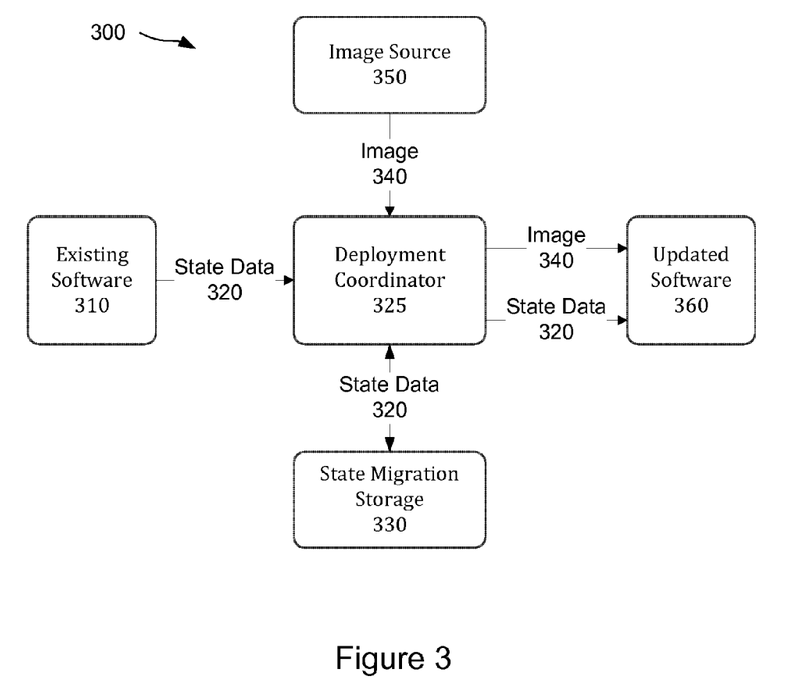
FIG. 3 is a block diagram illustrating the transfer of an update image and of state data in an environment for image-based updates.

Referring now to FIG. 3, an image-based update computing environment (300), which implements state data extraction and injection, will be described. Existing software (310) can be configured according to state data (320). A deployment coordinator (325) can separate the state data (320) from the existing software (310) by extracting the state data (320) from the existing software (310) and storing the state data (320) in state migration storage (330). The deployment coordinator (325) can retrieve an image (340) from an image source (350), such as an update DVD, a local hard drive, or a remote computer system. The deployment coordinator (325) can store the image (340) in the computing environment (300) where it can be run by an underlying virtual or physical machine, thus forming the updated software (360). The deployment coordinator (325) can retrieve the state data (320) from the state migration storage (330) and inject the state data (320) into the updated software. Alternatively, the updated software (360) can retrieve the state data (320) without assistance from the deployment coordinator (325).

C. Modular Deployment Coordinator

Figure 4:
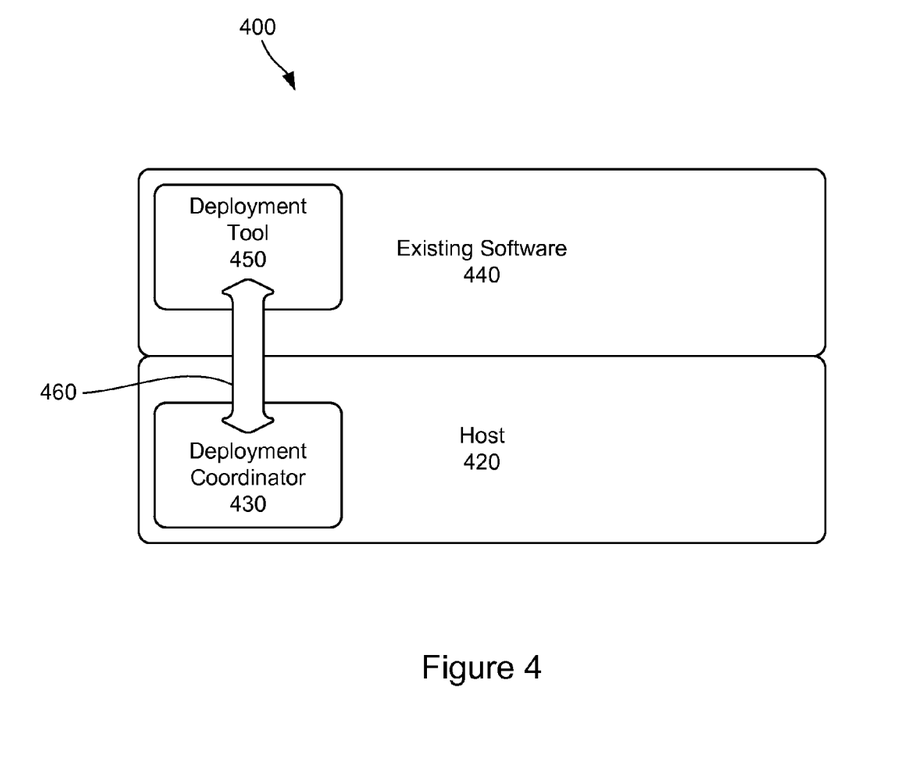
FIG. 4 is a block diagram illustrating a deployment coordinator and deployment tool according to one embodiment.

In some situations, software developers may not know what functions the deployment coordinator needs to perform until the update image is finalized. Accordingly, the deployment coordinator itself may be provided or updated when the update image is provided. Referring to FIG. 4, in some situations an update environment (400) may include a host (420), such as a virtualization host or a physical machine. As an example, the host (420) can be a virtual machine managed by a hypervisor, such as the hypervisor in Microsoft's Hyper-V™ technology.

A deployment coordinator (430) can run on the host (420). An existing software stack (440) can include a deployment tool (450), which can aid the deployment coordinator (430) in extracting state data from the existing software stack (440), as discussed above. Prior to such extraction, the deployment coordinator (430) may update the deployment tool (450). Indeed, the deployment tool (450) may be just a shell in the existing software stack (440) until the deployment coordinator (430) provides the tool (450) with an update that includes the logic for extracting the state data from the existing software. Alternatively, the deployment tool could be created and/or updated in some other way. For example, the existing software stack (440) could be updated in a conventional way (e.g., using the Microsoft Update updating service) prior to the image-based update. This conventional update could prepare the existing software stack (440) for the image-based update, such as by installing the deployment tool (450). The deployment coordinator (430) can communicate with the deployment tool (450) over an internal network (460) to provide instructions and updates to the deployment tool, and to receive information (such as the state data) from the deployment tool (450). For example, in virtual environments, this can be done using internal virtual network interface cards, or some other communication technique.

Figure 5:
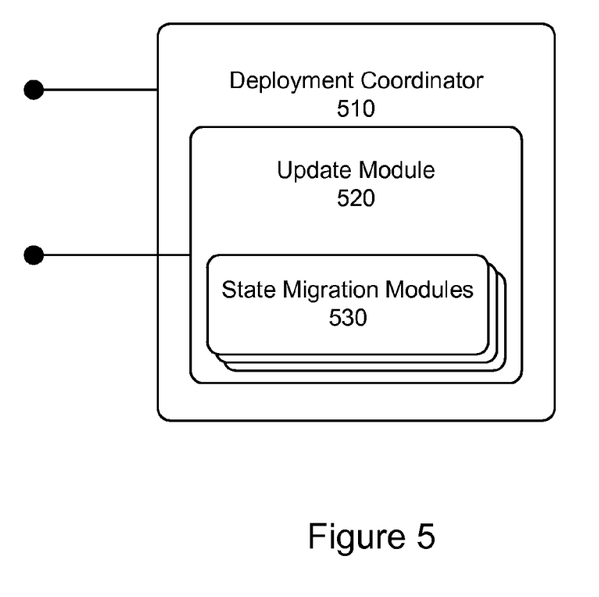
FIG. 5 is a block diagram illustrating an embodiment of a deployment coordinator.

Referring now to FIG. 5, a deployment coordinator (510) can include an update module (520) to coordinate a particular software update operation. For example, the update module (520) may be provided along with a software update image, and the module (520) may be injected into the deployment coordinator (510) as an initial operation in preparation for updating software with the software image. The update module (520) may also include one or more state migration modules (530) to oversee migration of state data from an existing software stack to an updated software stack. As is indicated by the line extending out from the deployment coordinator (510), the deployment coordinator (510) can be exposed to communicate with other components in a computing environment. Likewise, a line extending out from the update module indicates that the update module (520) can be exposed to communicate with other computing environment components, such as a software stack to be updated and/or a state data migration storage device.

The deployment coordinator may take many other different forms and have different configurations, depending on the demands of particular implementations.

D. Database Server Computing Environment Example

Figure 6:
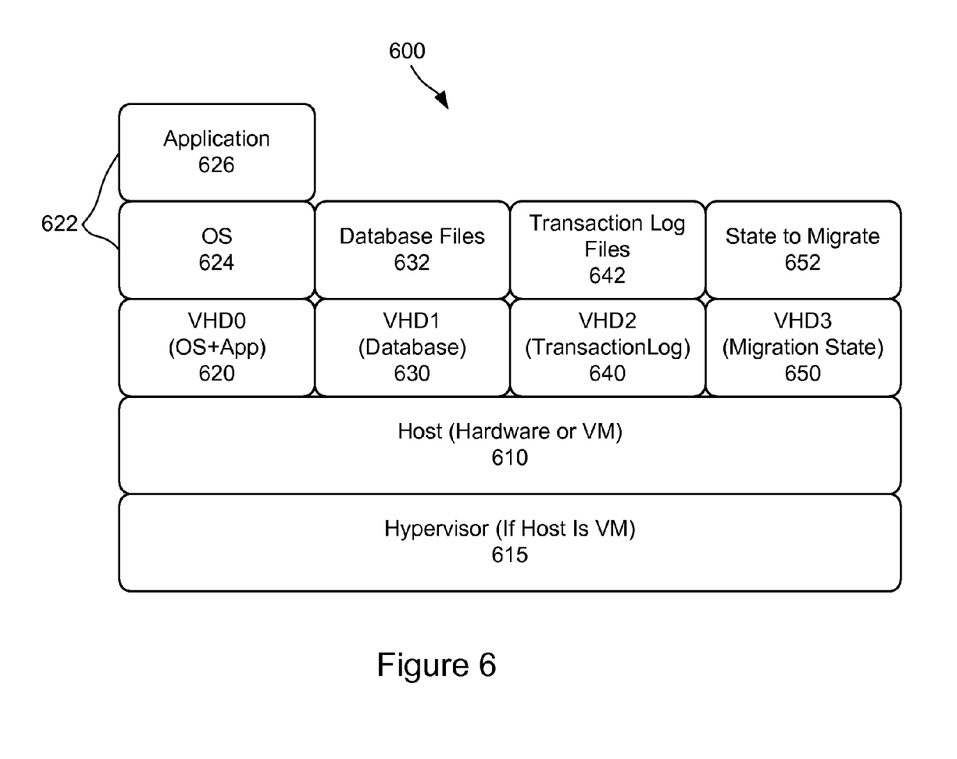
FIG. 6 is a block diagram of a database server implementation of an image-based software update environment.

Referring to FIG. 6, an exemplary computing environment (600) is illustrated where the software stack to be updated is a database server application running on an operating system. Of course, the tools and techniques described herein can be used to update many other types of server and non-server software stacks. The computing environment (600) can include a host (610), which can be a virtual machine (which can be managed by a hypervisor (615)) or a physical hardware machine.

The host (610) can support one or more virtual hard drives, which can be mapped to one or more physical hard drives. For example, a first virtual hard drive (VHD0 620) can store a software stack (622). The software stack can include an operating system (624), such as a Microsoft Windows Server® operating system, and one or more server applications (626). For example, the server applications (626) can include a database server application (such as Microsoft SQL Server® database software) and an IT management application (such as Microsoft System Center Essentials IT management software).

A second virtual hard drive (VHD1 630) can store database files (632), such as *.mdb files. In addition, a third virtual hard drive (VHD2 640) can store transaction log files (642). A fourth virtual hard drive (VHD3 650) can be a state migration storage location, and can store state data (652) for the software stack (622).

When the software stack (622) is updated, the entire first virtual hard drive (VHD0 620) can be replaced with a new virtual hard drive (VHD0 620) that includes the updated software stack image. State data (652) that is extracted from the software stack (622) before the update can be stored in the fourth virtual hard drive (650) until the state data (652) is injected into the updated software stack (622). The fourth hard drive (650) can then be erased or removed altogether from the computing environment (600). The database files (632) and the transaction log files (642) can also include state data. However, those files (632 and 642) are already separated from the software stack (622) by being maintained separately during ordinary operation of the software stack (622). Those already-separate files (632 and 642) can be accessed by the existing and updated software stacks (622), and the already-separate files (632 and 642) typically do not need to be migrated during a software update.

III. Image-Based Software Update Techniques

Techniques for image-based software stack updates will now be described. The techniques can be executed in computing environments such as those described above, or in other computing environments.

A. General Image-Based Software Stack Update Technique

Figure 7:
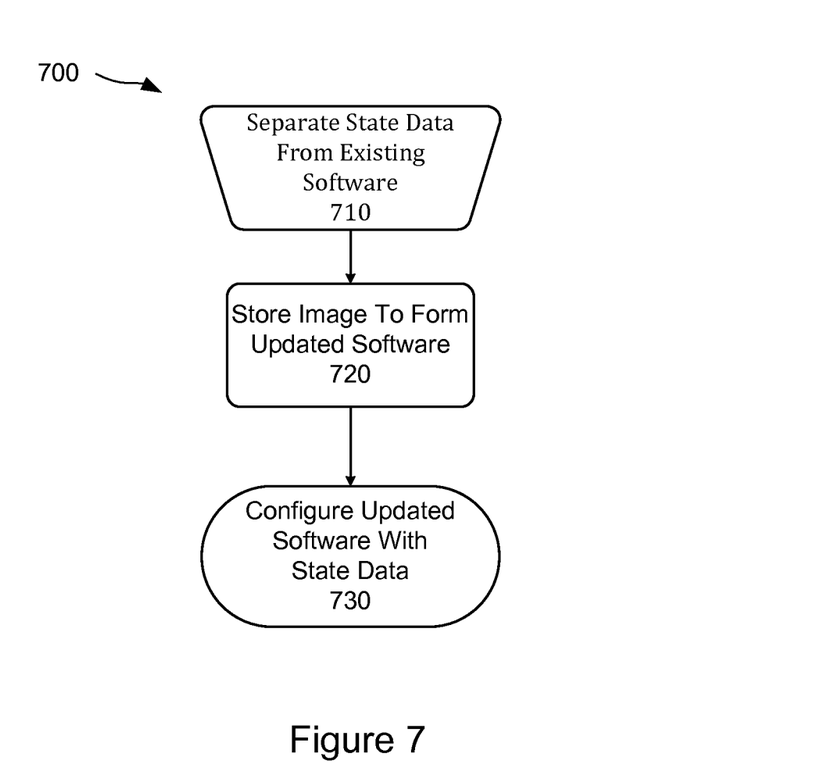
FIG. 7 is a flow diagram illustrating a technique for image-based software updating.

Referring to FIG. 7, a general image-based software stack update technique (700) is illustrated. The technique (700) includes separating (710) state data from an existing software stack, where the state data can represent one or more states of the existing software. This can include maintaining the state data separate from the software stack in the ordinary operation of the software stack, and/or extracting the state data from the software stack. The technique (700) can also include storing (720) a software stack update image to form an updated software stack. For example, this can include replacing the existing software stack with an image to form an updated software stack. Finally, the technique (700) can include configuring (730) the updated software with the state data that was separated from the existing software stack. This configuration can be done by modifying the software stack itself using the state data, and/or by providing the software stack with access to the state data.

B. Update Technique with State Data Extraction and Injection

Figure 8:
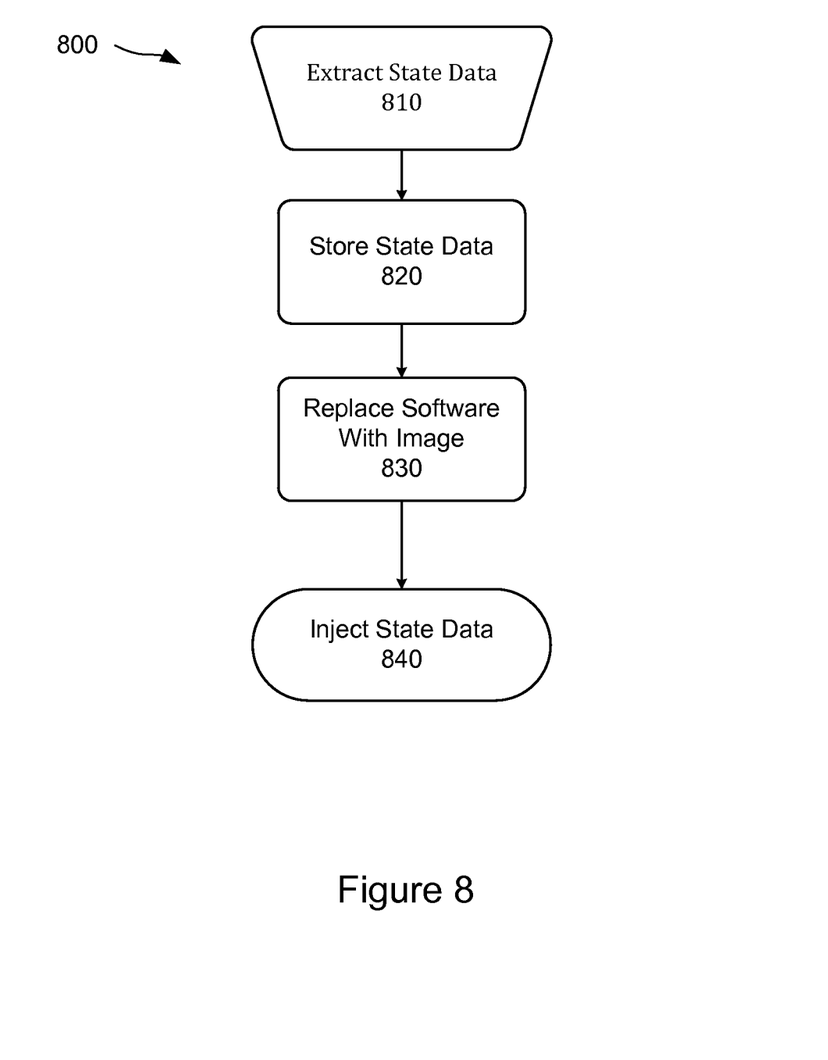
FIG. 8 is a flow diagram illustrating another technique for image-based software updating.

Referring to FIG. 8, an image-based software stack update technique (800), which includes data extraction and injection, is described. The technique (800) can include extracting (810) state data from the existing software stack that is to be updated. The extraction can be done by the software stack, a deployment coordinator, or some other module. The extracted state data can be stored (820) in a storage location that is separate from a storage location of the software stack. The technique (800) can also include replacing (830) the existing software stack with an image to form an updated software stack. Finally, the extracted state data can be injected (840) into the updated software stack, such as by storing the state data in an appropriate place to be accessed by the updated software stack or by passing the state data to the software stack.

C. Exemplary Update Technique

Figure 9:
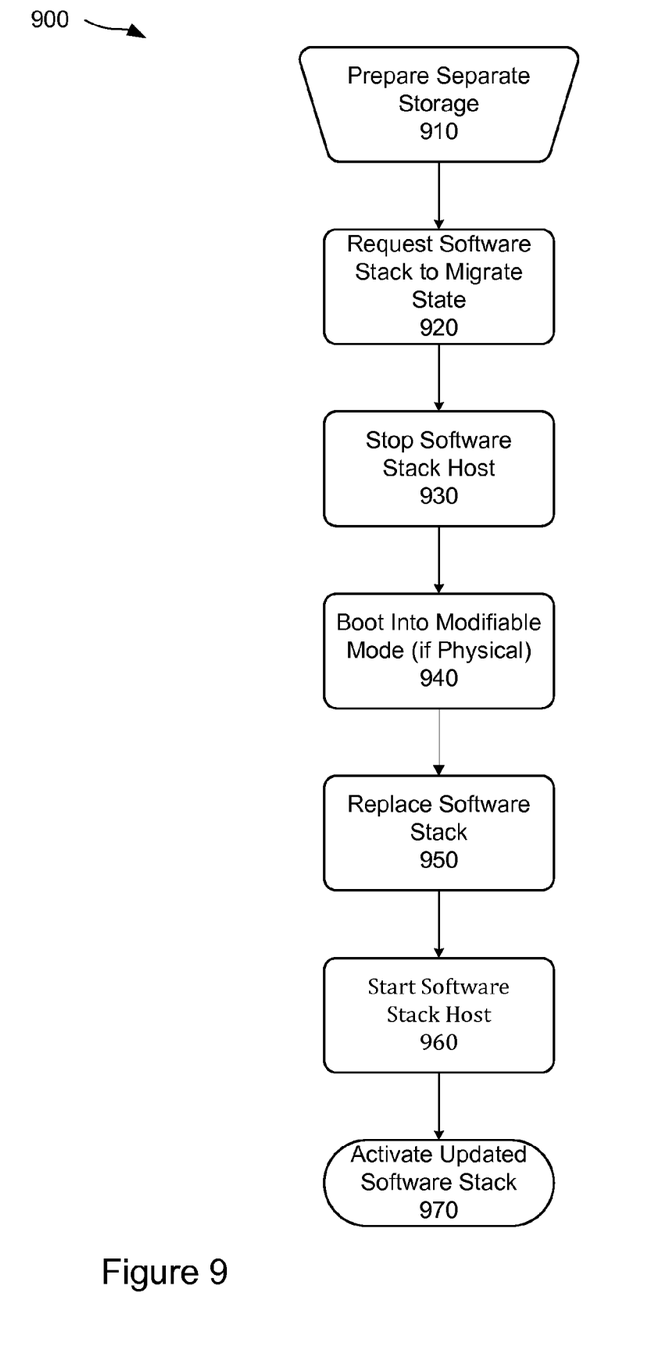
FIG. 9 is a flow diagram illustrating yet another technique for image-based software updating.

Referring to FIG. 9, an example of an image-based update technique (900) will be described. In the technique (900), a separate state migration storage space, such as a virtual hard drive, can be prepared (910) to store state data to be migrated to an updated software stack. The existing software stack can be requested (920) to extract the state data and store it in the state migration storage space. After the software stack extracts the state data, a software stack host that the software stack is running on can be stopped (930). If the software stack host is a physical machine, the technique (900) can include booting (940) into a mode where the bootable storage space, such as a virtual hard drive, that includes the software stack can be safely modified without crashing the physical machine. For example, this can include booting from a DVD or other portable storage device. Then, the software stack can be replaced (950) with an image to form an updated software stack. The software stack host (e.g., the physical or virtual machine) can then be started (960), and the updated software stack (970) can be activated and configured according to the extracted state data.

Other techniques could also be used. For example, storage spaces other than virtual hard drives (e.g., physical hard drives) could be used in similar techniques. Also, this technique could be implemented in different ways, such as by using a deployment coordinator to automate the technique, or by requiring user input to prompt the technique to proceed.

D. Exemplary Update Technique on a Virtual Host

Figure 10:
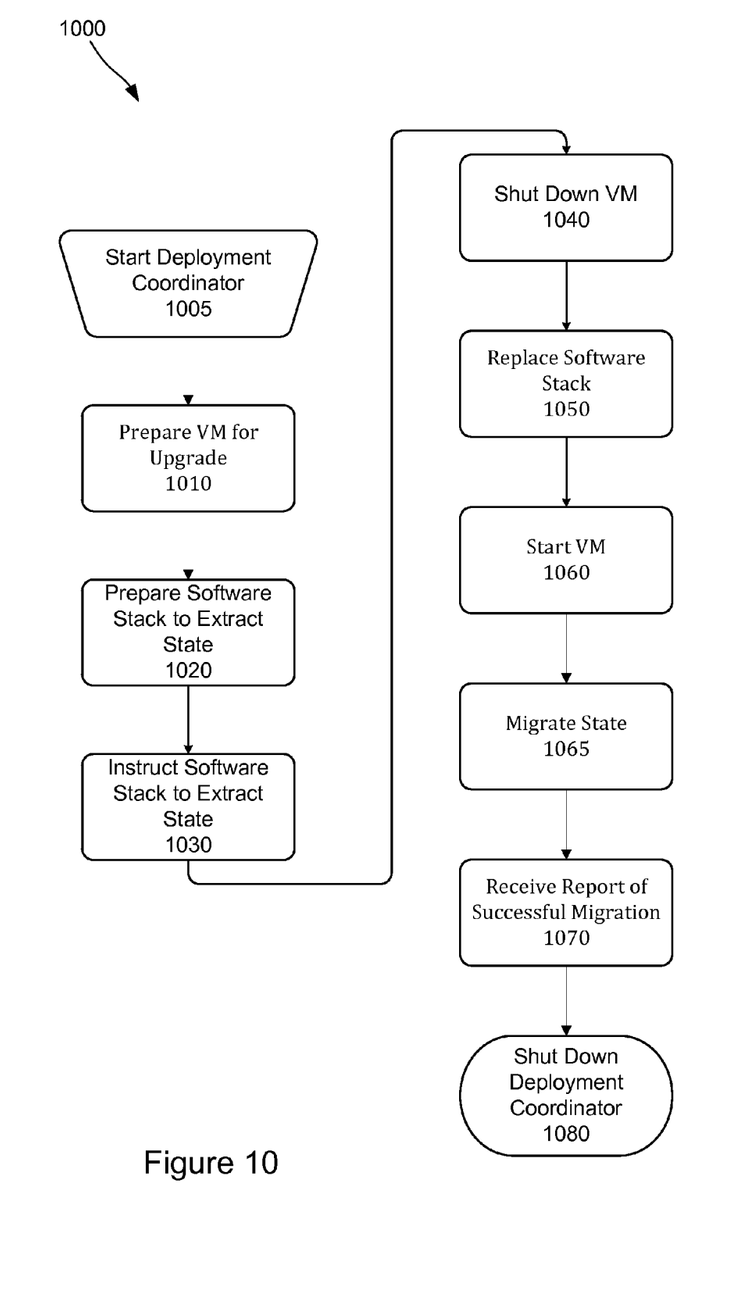
FIG. 10 is a flow diagram illustrating a technique for image-based software updating on a virtual machine.

Referring to FIG. 10, an example of an image-based update technique (1000) in a virtual host environment will be described, where a deployment coordinator is used to automate the technique. It should be understood that, as with other computing components described herein, the deployment coordinator may include software to directly perform actions that are described as being performed by the deployment coordinator. Alternatively, the deployment coordinator may employ some other computer hardware and/or software components to perform one or more of the actions. In addition, one or more of the actions may be performed and/or triggered manually.

The deployment coordinator can be started (1005). Once started, the deployment coordinator can prepare (1010) a virtual machine for the update. The virtual machine can host an existing software stack to be updated. The deployment coordinator can also prepare (1020) the existing software stack to extract state data that will be migrated to the updated software stack. The deployment coordinator can also instruct (1030) the software stack to extract the state data and store it in a storage location that is separate from the software stack-such as in a separate virtual hard drive. The virtual hard drive can be a new virtual hard drive that is prepared just prior to the update, or it can be a pre-existing hard drive. Alternatively, some other storage unit, such as a physical hard drive, could be used instead of the virtual hard drive.

Once the state data is extracted, the deployment coordinator can shut down (1040) the virtual machine so that the software stack can safely be replaced. However, the hypervisor that manages the virtual machine can remain active, and the deployment coordinator can run on the hypervisor and remain active. With the virtual machine supporting the software stack shut down, the deployment coordinator can replace (1050) the existing software stack with an image to form an updated software stack.

The deployment coordinator can then restart (1060) the virtual machine, and the state data can be migrated (1065). For example, the updated software stack can be configured to inject the state data into the software stack when the updated software stack is first activated. Thus, after starting (1060) the virtual machine, the deployment coordinator can wait to receive (1070) a report from the software stack that the migration of state data was successful. The updated software stack may also prompt a user for additional information when the software stack is activated. After receiving (1070) the report that the state data migration was successful, the deployment coordinator can shut down (1080).

E. Exemplary Update Technique on a Physical Host

Figure 11:
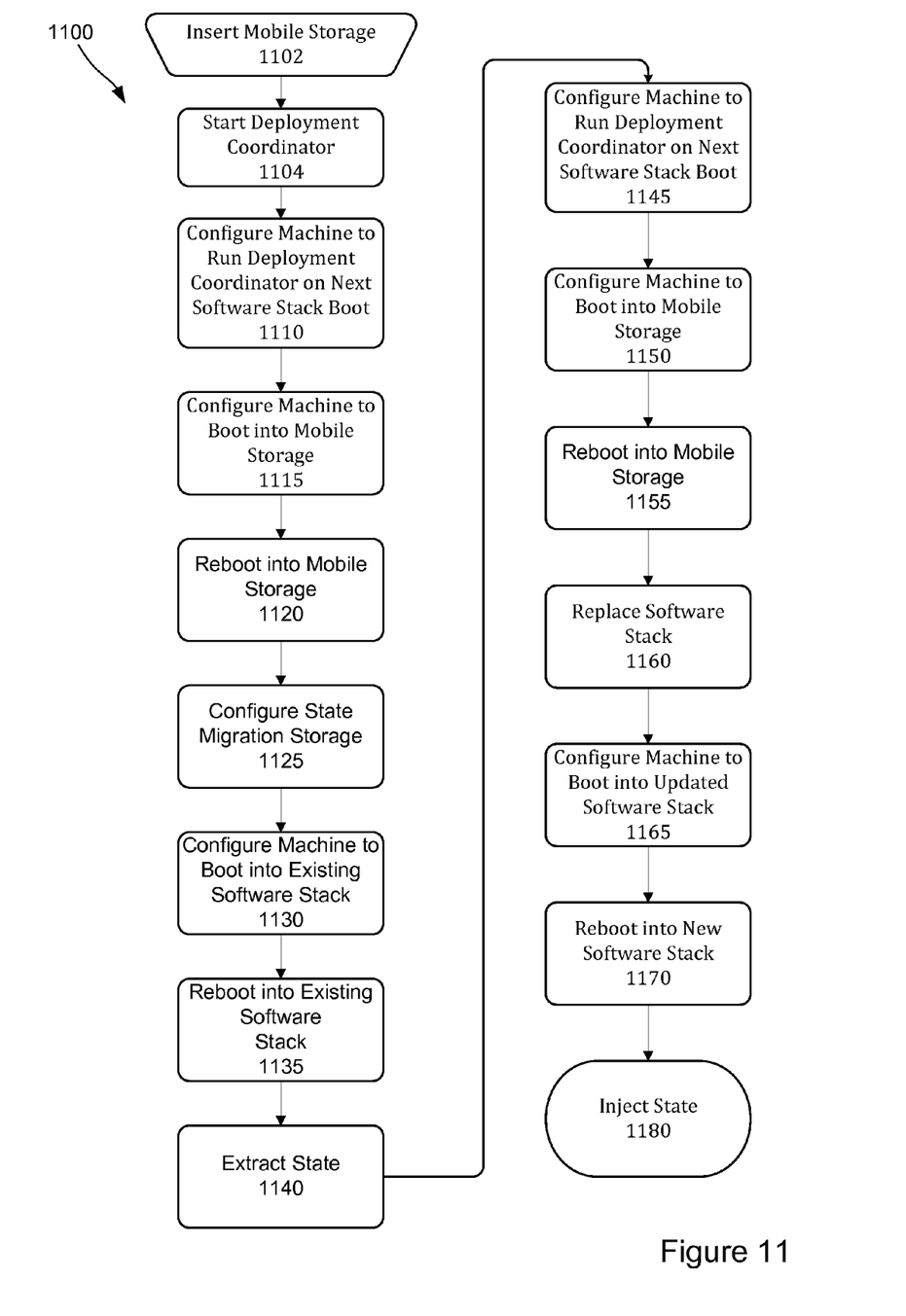
FIG. 11 is a flow diagram illustrating a technique for image-based software updating on a physical machine.

A technique (1100) for an image-based software stack update on a physical host will now be described with reference to FIG. 11. The technique (1100) can include inserting (1102) a mobile storage device. For example, the mobile storage device can be a DVD that includes the updated software stack image and at least some components of a deployment coordinator. The deployment coordinator can be started (1104). The deployment coordinator can configure (1110) the physical machine to run the deployment coordinator the next time the machine boots into the software stack. The deployment coordinator can also configure (1115) the physical machine to boot into the mobile storage device the next time the physical machine is booted. The deployment coordinator can then prompt the physical machine to reboot (1120), which will result in the machine rebooting into the mobile storage device.

The deployment coordinator software booting from the mobile storage device can configure (1125) the physical machine with a new state migration storage location to put state data for the software stack. For example, this can include creating and mounting a virtual hard drive for migrating state data. This virtual hard drive may have been pre-existing, although using a pre-existing state migration hard drive may reduce the reliability of the updated software stack because the state migration virtual hard drive would likely not be starting from a known state.

The deployment coordinator can configure (1130) the machine to boot back into the software stack, and can reboot (1135). With the machine booted into the existing software stack, the deployment coordinator can extract (1140) the state data from the existing software stack to the state migration storage location. For example, his may be done directly by the deployment coordinator, or it may be done by the deployment coordinator instructing the software stack to extract its state.

With the state having been extracted (1140) to the location separate from the software stack, the deployment coordinator can configure (1145) the machine to run the deployment coordinator the next time the machine boots into the software stack. The deployment coordinator can also configure (1150) the machine to boot into mobile storage on the next boot, and then reboot (1155) the machine. The deployment coordinator can then replace (1160) the existing software stack with the updated image to form an updated software stack that can run on the physical machine. The deployment coordinator can also configure (1165) the machine to boot into the updated software stack, and can reboot (1170) the machine. When the machine reboots (1170), the software stack can be activated and the state can be injected (1180) into the software stack. For example, injecting (1180) the state data can be part of an activation technique for the updated software. That activation technique may also include prompting a user for addition configuration information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented method, comprising:
separating state data from an existing software stack stored in one or more computer storage units in a computer system, the existing software stack comprising operating system software and application software, and the state data representing one or more states of the existing software stack;
receiving an image from outside the computer system;
storing the image in one or more computer storage units in the computer system, the stored image being an updated software stack comprising operating system and application software; and
configuring the updated software stack using the state data.

2. The method of claim 1, wherein the computer system comprises a virtual host, wherein the virtual host hosts the existing software stack prior to the image being stored in the one or more computer storage units, and the virtual host hosts the updated software stack after the image is stored in the one or more computer storage units.

3. The method of claim 1, wherein the image is an appliance.

4. The method of claim 1, further comprising deleting the existing software stack.

5. The method of claim 1, wherein separating the state data comprises:
extracting the state data from the existing software stack; and
storing the extracted state data in one or more state migration storage units that are separate from the one or more storage units where the existing software stack is stored.

6. The method of claim 5, wherein storing the extracted state data in the one or more state migration storage units comprises storing the extracted state data in a first virtual hard drive.

7. The method of claim 6, wherein the one or more storage units where the existing software stack is stored comprise a second virtual hard drive.

8. The method of claim 1, wherein the existing software stack comprises a first version of an operating system, and the updated software stack comprises a second version of the operating system that is newer than the first version.

9. The method of claim 1, wherein the existing software stack comprises a first version of an application, and the updated software stack comprises a second version of the application that is newer than the first version.

10. A computer system comprising:
an existing software stack stored in a first set of one or more storage units, the software stack comprising operating system and application software;
state data stored in a second set of one or more storage units, the state data representing one or more states of the existing software stack; and
a deployment coordinator configured to store an image in the computer system, the image stored in the computer system being an updated software stack comprising operating system and application software, the updated software stack being configured to access the state data.

11. The system of claim 10, wherein the deployment coordinator is configured to replace the existing software stack with the image in the first set of storage units.

12. The system of claim 10, wherein the image is an appliance.

13. The system of claim 10, further comprising a hypervisor supporting a virtual host, wherein the deployment coordinator is configured to run on the hypervisor.

14. The system of claim 13, wherein the existing software stack is configured to run on the virtual host, and the deployment coordinator is configured to initiate the updated software stack to run on the virtual host.

15. The system of claim 10, wherein the first set of one or more storage units comprises a first virtual hard drive and the second set of one or more storage units comprises a second virtual hard drive.

16. One or more computer-readable storage media having computer-executable instructions embodied thereon that, when executed, perform acts comprising:
extracting state data from an existing software stack;
replacing the existing software stack with an image to form an updated software stack, replacing the existing software stack comprising storing the image, the stored image being the updated software stack, the existing software stack remaining stored after the updated software stack becomes operational, and replacing the existing software stack with the image comprising deleting the existing software stack after the updated software stack becomes operational; and
injecting the state data into the updated software stack.

17. The one or more computer-readable media of claim 16, wherein the acts further comprise storing the state data in a storage location that is separate from a storage location of the existing software stack.

18. The one or more computer-readable media of claim 17, wherein the storage location of the state data is a virtual hard drive.

19. The one or more computer-readable media of claim 16, wherein the updated software stack is configured to run on a virtual host.

20. The one or more computer-readable media of claim 16, wherein replacing the existing software stack with the image comprises:
storing the image in an updated location separate from an existing storage location of the existing software stack; and
deleting the existing software stack from the existing storage location after the updated software stack is stored in the updated location.

* * * * *